(12) United States Patent
Cho

(10) Patent No.: US 8,706,175 B2
(45) Date of Patent: Apr. 22, 2014

(54) PHONE AND TABLET STAND

(76) Inventor: Richard H Cho, Sunnyvale, CA (US)

(*) Notice: Subject to any disclaimer, the term of this patent is extended or adjusted under 35 U.S.C. 154(b) by 0 days.

(21) Appl. No.: 13/434,518

(22) Filed: Mar. 29, 2012

(65) Prior Publication Data

US 2012/0252543 A1  Oct. 4, 2012

Related U.S. Application Data

(60) Provisional application No. 61/469,734, filed on Mar. 30, 2011.

(51) Int. Cl.
*H04W 88/02* (2009.01)
(52) U.S. Cl.
USPC .................. 455/575.8; 455/351; 248/205.1
(58) Field of Classification Search
USPC ............. 455/550.1, 575.1, 575.8, 90.1, 347, 455/351; 248/205.1, 205.5, 206.5; 379/454, 379/455
See application file for complete search history.

(56) References Cited

U.S. PATENT DOCUMENTS

2004/0188576 A1* 9/2004 Carnevali ................. 248/206.5
2007/0120026 A1* 5/2007 Chen ......................... 248/205.5

* cited by examiner

*Primary Examiner* — Thanh Le
(74) *Attorney, Agent, or Firm* — Michael Ries

(57) ABSTRACT

A phone and tablet stand that includes a rotatable mounting head that attaches a tablet to the phone and tablet stand, attachment magnets that are evenly disposed on a rotatable mounting head to magnetically attach a tablet to the phone and tablet stand and an adjustable stand that includes a stem and a pair of adjustment knobs. The phone and tablet stand also includes a base that provides stability to the phone and tablet stand and a gel attachment interface that is in direct contact with a contact surface where the phone and tablet stand is removably secured. The phone and tablet stand can also include a protective casing that is placed around the back of a tablet and is magnetically attached to the phone and tablet stand and includes a metal disc disposed and centered on the front facing of the protective casing.

13 Claims, 6 Drawing Sheets

PHONE AND TABLET STAND

This application claims priority to U.S. Provisional Application 61/469,734 filed on Mar. 30, 2011, the entire disclosure of which is incorporated by reference.

TECHNICAL FIELD & BACKGROUND

With the latest emergence of tablet computers and Smartphones, there is no easy way to mount on and off and hold-up these devices on various surfaces and for various applications, while providing protection and an element of style to these devices.

It is an object of the invention to provide a phone and tablet stand that enables a Smartphone or tablet device to be relatively easily installed on a plurality of different surfaces.

It is an object of the invention to provide a phone and tablet stand that is relatively very adjustable that can move and rotate an attached Smartphone or tablet device in a plurality of different positions and orientations.

It is an object of the invention to provide a phone and tablet stand that provides instant mountability without one or more mechanical connections, latching or bonding, such as one or more snaps, adhesive or VELCRO™ hook and loop fasteners.

What is really needed is a phone and tablet stand that enables a Smartphone or a tablet device to be relatively easily installed on a plurality of different surfaces that is relatively very adjustable that can move and rotate an attached Smartphone or a tablet device in a plurality of different positions and orientations that provides instant mountability without one or more mechanical connections, latching or bonding, such as one or more snaps, adhesive or VELCRO™ hook and loop fasteners.

BRIEF DESCRIPTION OF THE DRAWINGS

The present invention will be described by way of exemplary embodiments, but not limitations, illustrated in the accompanying drawing in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1A:
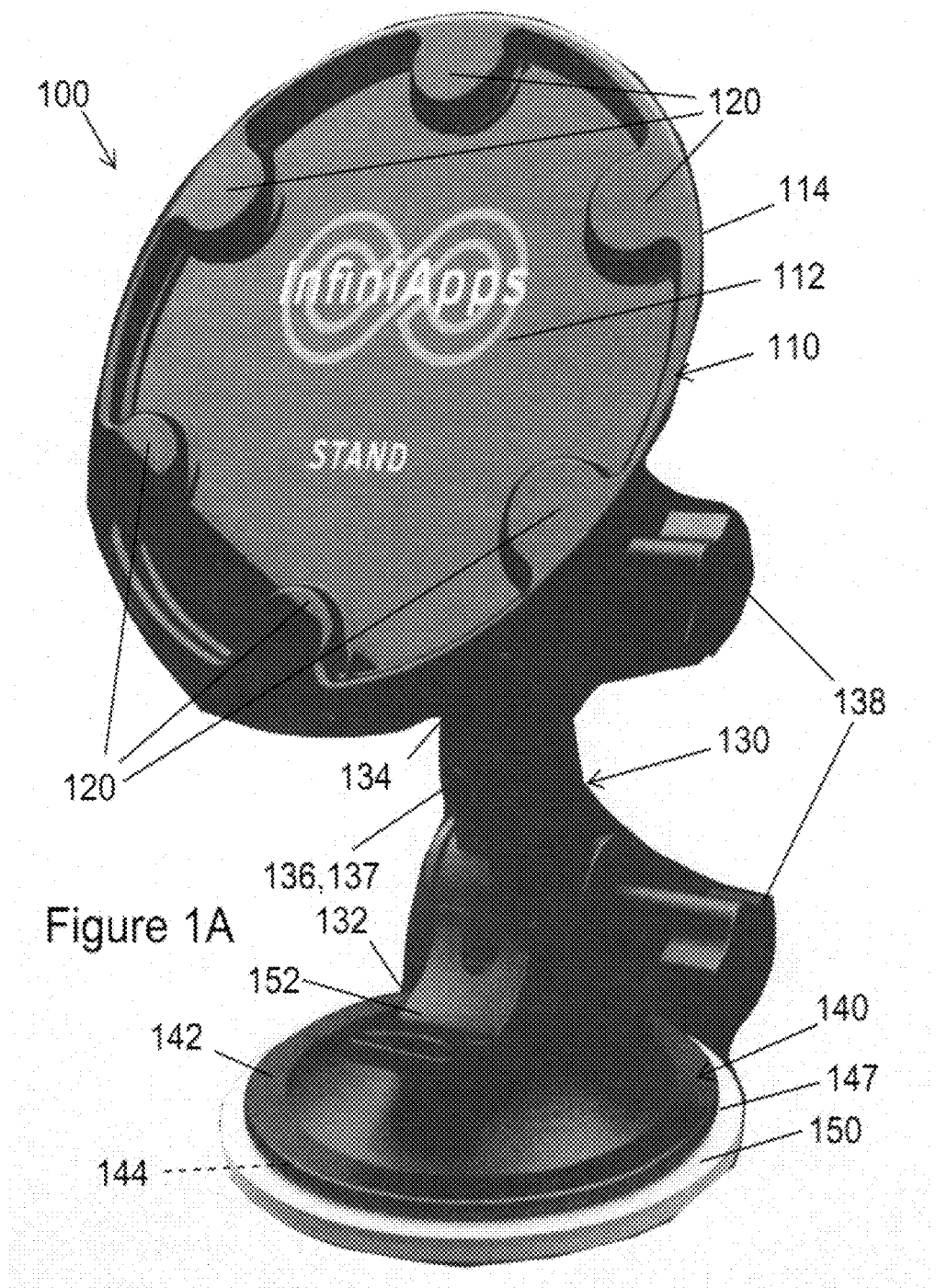
FIG. 1A illustrates a front perspective view of a phone and tablet stand, in accordance with one embodiment of the present invention.

FIG. 1A illustrates a front perspective view of a phone and tablet stand 100, in accordance with one embodiment of the present invention. The phone and tablet stand 100 enables a tablet device (See FIGS. 1B, 1C and 1D) to be relatively easily installed on a plurality of different surfaces that is relatively very adjustable that can move and rotate an attached tablet device in a plurality of different positions and orientations that provides instant mountability without one or more mechanical connections, latching or bonding, such as one or more snaps, adhesive or VELCRO™ hook and loop fasteners.

The phone and tablet stand 100 includes a rotatable mounting head 110, a plurality of attachment magnets 120, an adjustable stand 130, a base 140 and a gel attachment interface 150. The rotatable mounting head 110 has a front facing 112 and a front facing perimeter 114 and receives and removably attaches a tablet device to the phone and tablet stand 100. The plurality of attachment magnets 120 are evenly disposed on the front facing perimeter 114 to magnetically attach a Smartphone or a tablet device to the phone and tablet stand 100. The attachment magnets 120 are rubber coated to produce a relatively high friction surface over molding with rubber or silicone and also by attaching high friction labels or film over the magnets to achieve a relatively high friction. The attachment magnets 120 can include having one ring shaped magnet or one center disk shaped magnet. The adjustable stand 130 includes a distal end 132, a proximal end 134, a stem 136 and a pair of adjustment knobs 138. The distal end 132 of the adjustable stand 130 receives and secures the rotatable mounting head 110 to the phone and tablet stand 100. The proximal end 134 receives and secures the base 140 to the phone and tablet stand 100. The stem 136 is a vertical stem 137 positioned between the distal end 132 and the proximal end 134 of the adjustable stand 130 and secures the rotatable mounting head 110 in an adjustably upward elevated position. The pair of adjustment knobs 138 are horizontally disposed on the stem 136 and enable the adjustable stand 130 to rotate the rotatable mounting head 110 360 degrees and move the rotatable mounting head 110 horizontally upward or downward and vertically upward or downward as desired by a user.

The base 140 has a top portion 142 and a bottom surfacing 144 and provides stability to the phone and tablet stand 100. The top portion 142 is permanently secured to the distal end 132 of the adjustable stand 130. The gel attachment interface 150 is in direct contact with a contact surface where the phone and tablet stand 100 will be removably secured. The contact surface is typically cleaned with a clean cloth, water or a cleaning agent or other suitable cleaning equipment and chemicals. The gel attachment interface 150 is disposed on the bottom surface perimeter 147 disposed on the bottom surfacing 144 of the base 140. The gel attachment interface 150 may be an elastomer selected from the group consisting of polyurethane, silicone or PVC. The gel attachment interface 150 also serves as a removable adhesive resulting in effective adhesion even on a rough surface such as a dashboard. The gel attachment interface 150 also includes a lever 152 disposed above the base 140 that horizontally extends from the stem 136 that can be depressed to activate a suction capability of the gel attachment interface 150. The lever 152 can also be lifted to release the gel attachment interface 150 once activated for attachment to a desired surface and location.

Figure 1B:
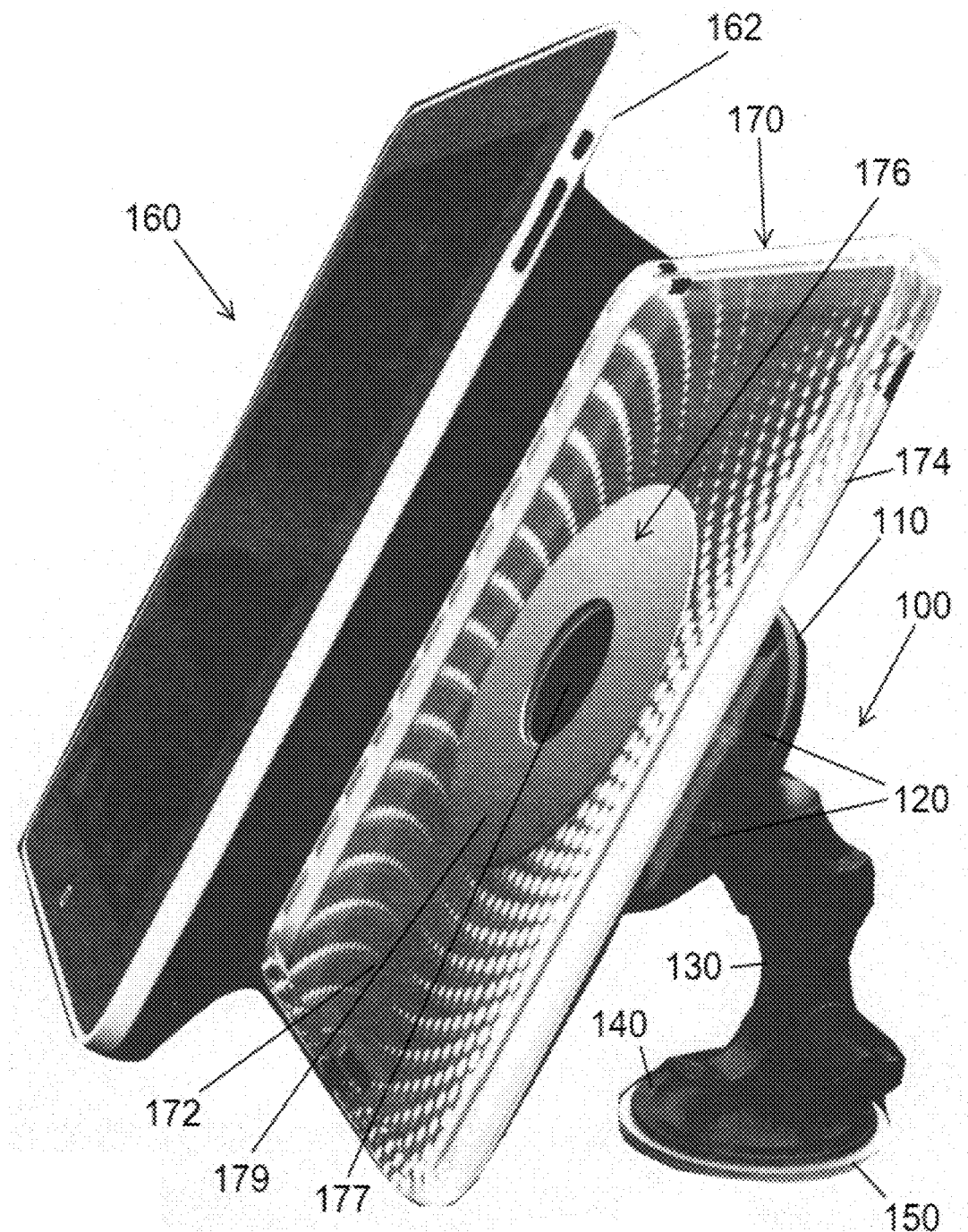
FIG. 1B illustrates a side exploded environmental perspective view of a phone and tablet stand holding a tablet, in accordance with one embodiment of the present invention.

FIG. 1B illustrates a side exploded environmental perspective view of a phone and tablet stand 100 holding a tablet 160, in accordance with one embodiment of the present invention.

The phone and tablet stand 100 includes all of the elements of the phone and tablet stand 100 described and illustrated in FIG. 1A and its description which include a rotatable mounting head 110, a plurality of attachment magnets 120 to include having one ring shaped magnet or one center disk shaped magnet, an adjustable stand 130, a base 140 and a gel attachment interface 150 and all of the rotatable mounting head 110, plurality of attachment magnets 120, adjustable stand 130, base 140 and gel attachment interface 150 supplemental features.

The phone and tablet stand 100 illustrated in FIG. 1B includes a tablet 160 and a protective casing 170. The tablet 160 includes a back 162 and can be any suitable tablet computer such as an IPAD™ tablet computer. The protective casing 170 has a front facing 172 and a back facing 174 and is placed around the back 162 of the tablet 160. A metal disc 176 is disposed and centered on the front facing 172 of the protective casing 170. The metal disc 176 is made of a magnetically conductive metal and can be attached to the protective casing 170 by adhesive or co-molded into the protective casing 170. The metal disc 176 has a center portion 177 and a perimeter portion 179. The protective casing 170 can be made from thermoplastic polyurethane, plastic, silicone, or any other suitable material which provides protection, high friction surface characteristics, aesthetic styling and is able to accommodate the metal disc 176 being attached.

Figure 1C:
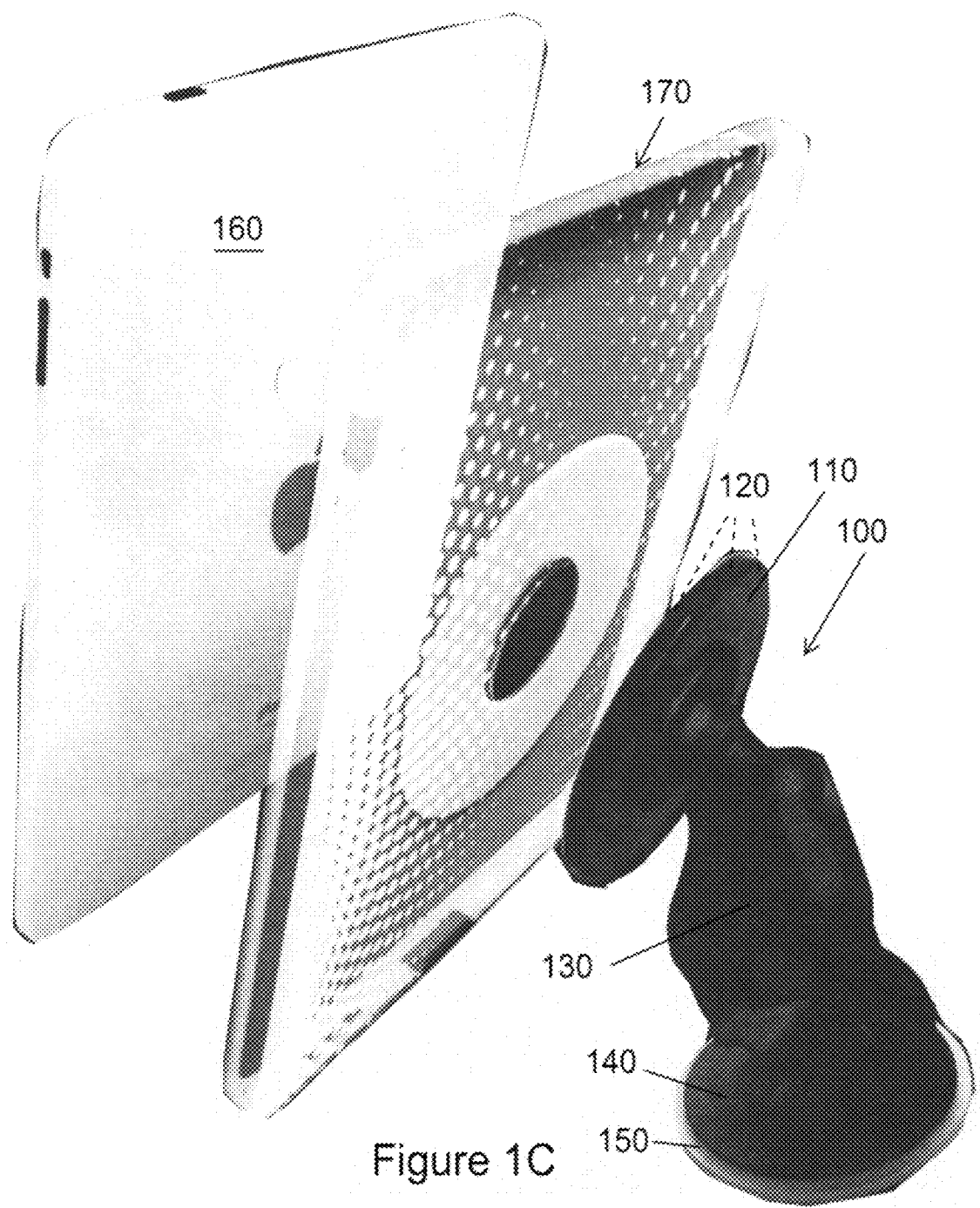
FIG. 1C illustrates a rear exploded environmental perspective view of a phone and tablet stand holding a tablet, in accordance with one embodiment of the present invention.

FIG. 1C illustrates a rear exploded environmental perspective view of a phone and tablet stand 100 holding a tablet 160, in accordance with one embodiment of the present invention.

The phone and tablet stand 100 includes all of the elements of the phone and tablet stand 100, the tablet 160 and the protective casing 170 described and illustrated in FIG. 1A and FIG. 1B and their description which include a rotatable mounting head 110, a plurality of attachment magnets 120, an adjustable stand 130, a base 140 and a gel attachment interface 150 and all of the rotatable mounting head 110, plurality of attachment magnets 120, adjustable stand 130, base 140, gel attachment interface 150, tablet 160 and protective casing 170 supplemental features.

Figure 1D:
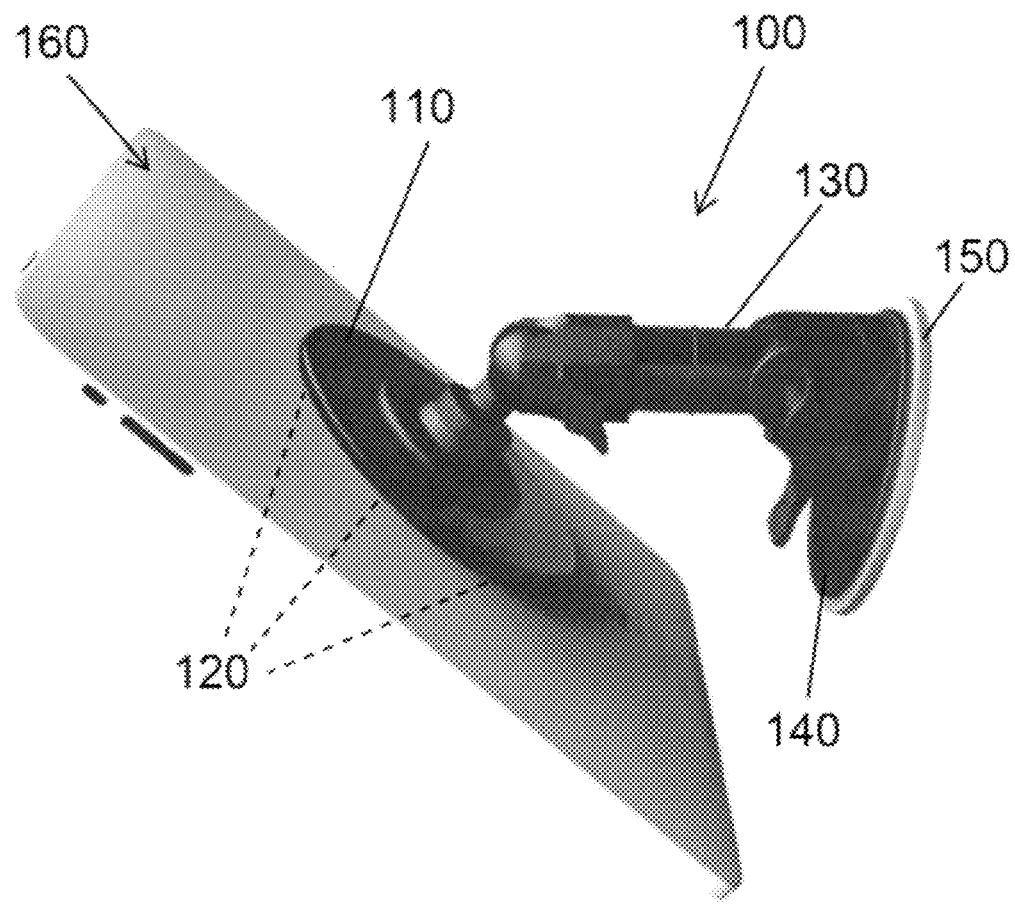
FIG. 1D illustrates a rear perspective view of a phone and tablet stand holding a tablet, in accordance with one embodiment of the present invention.

FIG. 1D illustrates a rear perspective view of a phone and tablet stand 100 holding a tablet 160, in accordance with one embodiment of the present invention.

The phone and tablet stand 100 includes all of the elements of the phone and tablet stand 100 described and illustrated in FIG. 1A and its description which include a rotatable mounting head 110, a plurality of attachment magnets 120, an adjustable stand 130, a base 140 and a gel attachment interface 150 and all of the rotatable mounting head 110, plurality of attachment magnets 120, adjustable stand 130, base 140 and gel attachment interface 150 supplemental features. The tablet 160 does not have the protective casing 170 that is described in FIGS. 1B and 1C. The tablet 160 can be directly removably attached to the rotatable mounting head 110 of the phone and tablet stand 100 by the attachment magnets 120 and can be manually separated or secured to the rotatable mounting head 110. The tablet 160 illustrated in FIG. 1D is attached to the phone and tablet stand 100 without a protective casing 170 illustrated and described in FIGS. 1B and 1C and its description.

Figure 2A:
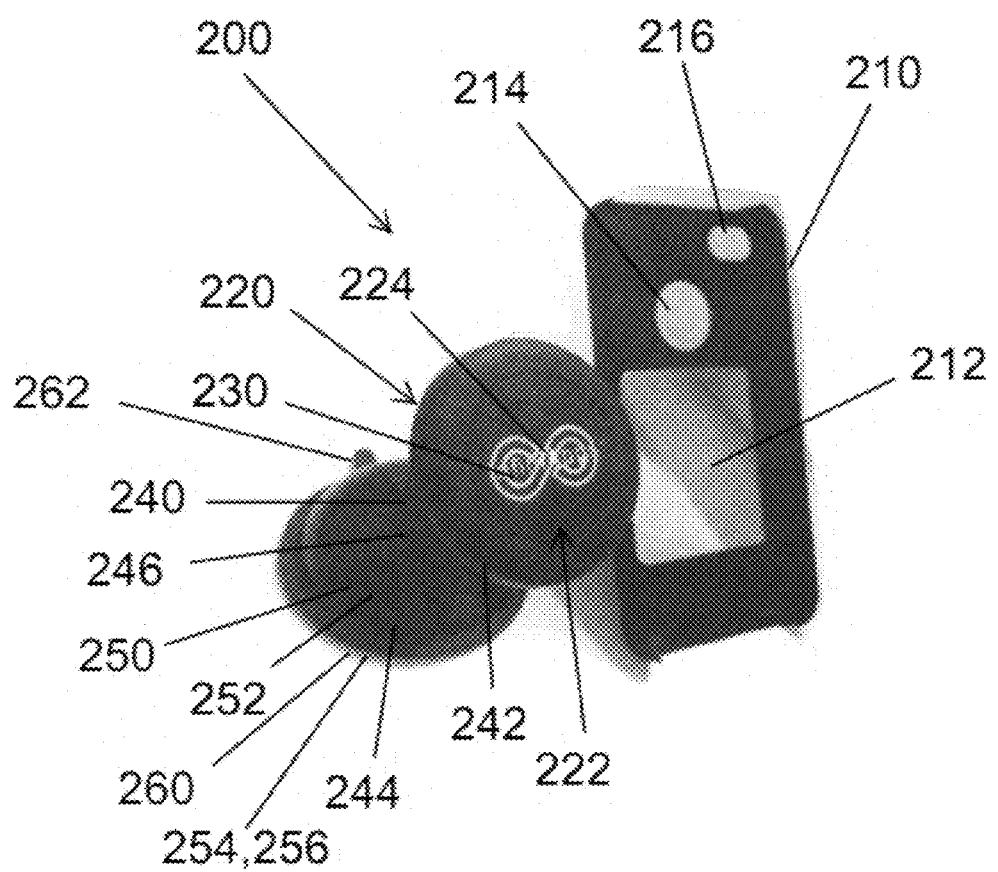
FIG. 2A illustrates a front perspective view of a phone and tablet stand, in accordance with one embodiment of the present invention.

FIG. 2A illustrates a front perspective view of a phone and tablet stand 200, in accordance with one embodiment of the present invention.

Figure 2B:
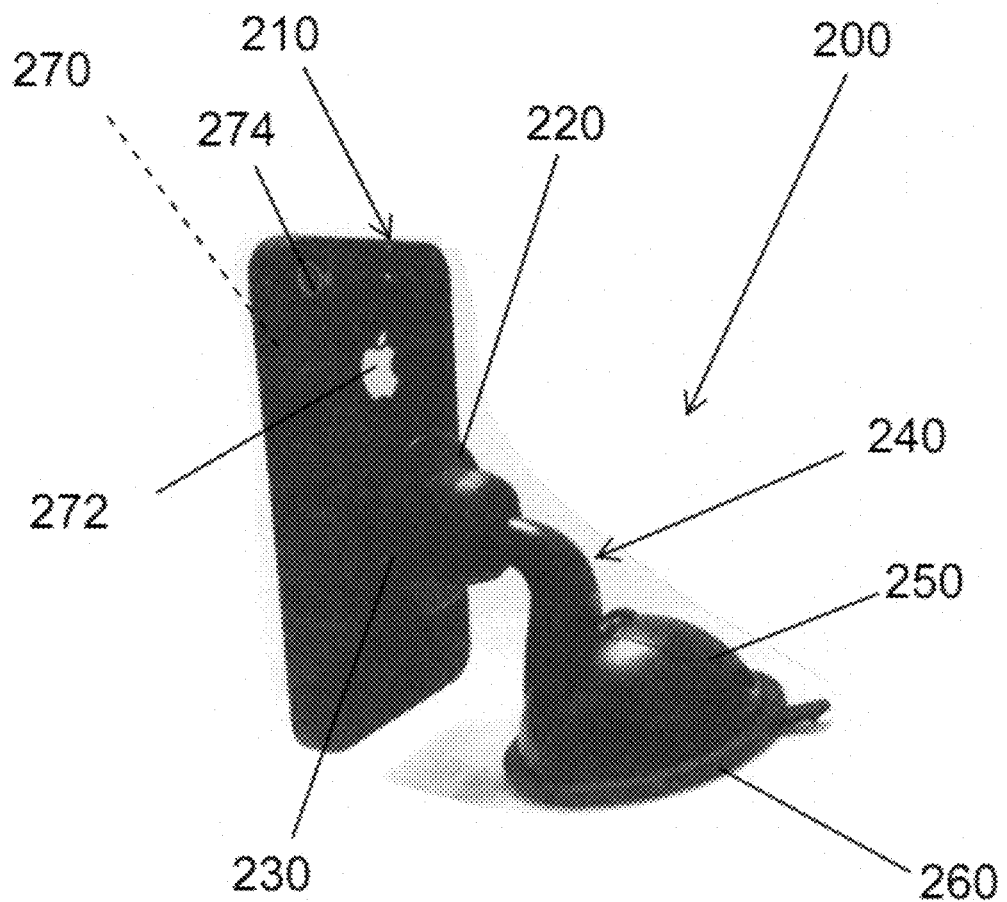
FIG. 2B illustrates a side perspective view of a phone and tablet stand, in accordance with one embodiment of the present invention.

The phone and tablet stand 200 can be used in combination with a protective casing 210 that is attached to a back of a Smartphone (FIG. 2B). The phone and tablet stand 200 includes a rotatable mounting head 220, a circular magnetic surface 230, an adjustable stand 240, a base 250 and a gel attachment interface 260. The rotatable mounting head 220 has a front facing 222 and a middle portion 224 and receives and removably attaches a Smartphone. The circular magnetic surface 230 is disposed directly on the front facing 222 of the rotatable mounting head 220 to magnetically removably attach a Smartphone to the phone and tablet stand 200. The adjustable stand 240 includes a distal end 242, a proximal end 244 and a stem 246. The distal end 242 of the adjustable stand 240 receives and secures the rotatable mounting head 220 to the phone and tablet stand 200. The proximal end 244 receives and secures the base 250 to the phone and tablet stand 200. The stem 246 is a vertical stem 248 positioned between the distal end 242 and the proximal end 244 of the adjustable stand 240 and secures the rotatable mounting head 220 in an adjustably upward elevated position. The stem 246 can be manually moved to position the rotatable mounting head 220 in any horizontally upward or downward and vertically upward or downward position as desired by a user. The base 250 has a top portion 252 and a bottom surfacing 254 with a perimeter 256 and provides stability to the phone and tablet stand 200.

The gel attachment interface 260 is in direct contact with a contact surface where the phone and tablet stand 200 will be removably secured. The contact surface is typically cleaned with a clean cloth, water or a cleaning agent or other suitable cleaning equipment and chemicals. The gel attachment interface 260 is disposed on the bottom surface perimeter 256 disposed on the bottom surfacing 254 of the base 250. The gel attachment interface 260 may be an elastomer such as polyurethane, silicone or PVC. The gel attachment interface 260 also serves as a removable adhesive resulting in effective adhesion even on a rough surface such as a dashboard. The gel attachment interface 260 also includes a lever 262 disposed above the base 250 that horizontally extends from the stem 246 that can be depressed to activate a suction capability of the gel attachment interface 260. The lever 262 can also be lifted to release the gel attachment interface 260 once activated for attachment to a desired surface and location.

The protective casing 210 includes a square magnetic surface 212, an icon aperture 214 and a camera aperture 216. The square magnetic surface 212 is a metal plate that attaches the protective casing 210 and Smartphone to the front facing 222 of the rotatable mounting head 220. The icon aperture 214 allows an icon such as an Apple Computer Icon (FIG. 2B) to be viewed while the protective casing 210 is on the Smartphone. The camera aperture 216 is positioned over a corresponding camera (FIG. 2B) of a Smartphone to allow a user usage of the corresponding camera while the protective casing 210 is on the Smartphone.

FIG. 2B illustrates a front perspective view of a phone and tablet stand 200, in accordance with one embodiment of the present invention. More specifically, FIG. 2B illustrates a Smartphone 270 being removably attached to the phone and tablet stand 200. The Smartphone 270 illustrated in FIG. 2B is an IPHONE™ Smartphone although other Smartphones 270 such as a BLACKBERRY™ Smartphone or any other suitable Smartphone can also be removably attached to the phone and tablet stand 200.

The phone and tablet stand 200 illustrated in FIG. 2B has the same elements as the phone and tablet stand 200 illustrated and described in FIG. 2B and its description and includes a rotatable mounting head 220, a circular magnetic surface 230, an adjustable stand 240, a base 250 and a gel attachment interface 260. FIG. 2B also includes the icon 272 and the camera 274 of the Smartphone secured in the protective casing 210

The phone and tablet stand utilizes magnetics to achieve a desired effect of relatively quick on and off mounting to an adjustable stand. A set of magnets are strategically positioned in a disc pattern and are attached to a rotatable mounting head. The adjustable stand has a gel attachment interface at the bottom which allows a Smartphone or tablet computer to be mounted on many different surfaces such as glass, granite, steel, wood, dash, tile, slightly porous surfaces and other suitable surfaces. The magnets are rubber coated or are inserted into a rubber casing, or over molded by silicone rubber to produce a high friction surface. A protective casing for the Smartphone and tablet has a metal disc attached to the inside surface of the protective casing. The metal disc can be a metal plate and is a magnetically conductive metal and can be attached to the protective casing by an adhesive or is co-molded into the protective casing and is made of thermoplastic polyurethane or TPU, plastic, silicone, or any other suitable material which provides protection power, high friction surface characteristics, aesthetic styling and an ability to accommodate metal disc attachment. The protective casing with the metal disc attached to the inside surface of the protective casing will be assembled on to the phone and tablet stand. Once assembled, the phone and tablet stand will become united as one device with the protective casing and the metal disc and will then magnetically attach to the magnets that are attached to the adjustable stand. The adjustable stand, rubber coated magnets, protective casing with metal disc all work together to make the phone and tablet stand work and differentiate the phone and tablet stand from other similar products which are mechanically attached via a VELCRO™ hook and loop fastener, one or more snaps or by sticky adhesive materials. The phone and tablet stand allows the tablets or smart phones to be kept protected, provides an adjustable stand and mounting ability with full adjustability and offers a relatively quick on and off feature. The phone and tablet stand allows the user to relatively easily and quickly mount their tablet or Smartphone to the adjustable stand, keep their device protected, enhance the appearance of their device and disconnect the device relatively quickly and easily from the adjustable stand.

The phone and tablet stand provides a relatively high amount of flexibility as to where a user can mount their tablet or Smartphone device. Users can easily transfer the location of the adjustable stand to any suitable location such as a car dashboard, a car windshield, a car sunroof, a refrigerator, a desk, a kitchen counter top, a wall, a bathroom or other suitable location and relatively easily and quickly mount the tablet or Smartphone device to the adjustable base. One of the main uses for the phone and tablet stand is for the tablet and Smartphones to be mounted easily and quickly while providing full mobility without the need for tools, drilling, cutting, or any other extensive work. Another way the phone and tablet stand can achieve a desired attachment result is to integrate the metal disk into the tablet or Smartphone device inside the back surface of the tablet or Smartphone, typically on the inside surface of the back of the tablet or Smartphone rather than on the protective casing with no need for the protective casing since the magnets and the metal disk inside the tablet or Smartphone will attract to create a bond or an attachment. A user can also assemble a compatible protective casing over the tablet or Smartphone which has the metal disk already built into the tablet or Smartphone resulting in relatively quick and easy mounting on and off and an ability to easily mount on many different locations such as a car, a desk, a kitchen, a wall or other suitable location without needing to drill, cut, screw, glue, hammer, or other processing while offering cosmetic aesthetics and protection to the device.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

The invention claimed is:

1. A phone and tablet stand, comprising:
a rotatable mounting head with a front facing and a front facing perimeter;
a plurality of attachment magnets that are evenly disposed on said front facing perimeter;
an adjustable stand that includes a distal end, a proximal end, a stem and a pair of adjustment knobs, wherein said distal end of said adjustable stand receives and secures said rotatable mounting head to said phone and tablet stand and said proximal end of said adjustable stand receives and secures said base to said phone and tablet stand and said stem is a vertical stem positioned between said distal end and said proximal end of said adjustable stand and secures said rotatable mounting head in an adjustably upward elevated position;
a base with a top portion and a bottom surfacing with a perimeter and provides stability to the phone and tablet stand, wherein said top portion is permanently secured to said distal end of said adjustable stand;
a gel attachment interface that is in direct contact with a contact surface where said phone and tablet stand is removably secured, wherein said gel attachment interface is disposed on said bottom surface perimeter disposed on said bottom surfacing of said base; and
a protective casing with a front facing and a back facing and is placed around said back of a tablet and is magnetically attached to said phone and tablet stand and includes a metal disc disposed and centered on said front facing of said protective casing.

2. The device according to claim 1, wherein said attachment magnets are rubber coated to produce a relatively high friction surface.

3. The device according to claim 1, wherein said pair of adjustment knobs are horizontally disposed on said stem and enable said adjustable stand to rotate said rotatable mounting head 360 degrees and move said rotatable mounting head horizontally upward or downward and vertically upward or downward.

4. The device according to claim 1, wherein said gel attachment interface is an elastomer.

5. The device according to claim 4, wherein said elastomer is selected from the group consisting of polyurethane, silicone or PVC.

6. The device according to claim 1, wherein said gel attachment interface includes a lever disposed above said base that horizontally extends from said stem and is depressed to activate a suction capability of said gel attachment interface and is lifted to release said gel attachment interface once said suction capability is activated to attach to a desired surface and location.

7. The device according to claim 1, wherein said metal disc is made of a magnetically conductive metal and is attached to said protective casing by adhesive or co-molded into said protective casing.

8. The device according to claim 1, wherein said protective casing is made from material selected from the group consisting of thermoplastic polyurethane, plastic or silicone.

9. A phone and tablet stand used in combination with a protective casing that is attached to a back of a Smartphone, comprising:
- a rotatable mounting head with a front facing and a middle portion;
- a circular magnetic surface that is disposed directly on said front facing of said rotatable mounting head to magnetically removably attach said protective casing and said Smartphone to said phone and tablet stand, said protective casing includes a square magnetic surface, an icon aperture and a camera aperture, said square magnetic surface attaches said protective casing and said back of said Smartphone to said front facing of said rotatable mounting head;
- an adjustable stand that includes a distal end, a proximal end and a stem wherein said distal end of said adjustable stand receives and secures said rotatable mounting head to said phone and tablet stand, said proximal end receives and secures said base to said phone and tablet stand and said stem is a vertical stem positioned between said distal end and said proximal end of said adjustable stand and secures said rotatable mounting head in an adjustably upward elevated position;
- a base with a top portion and a bottom surfacing with a perimeter and provides stability to said phone and tablet stand; and
- a gel attachment interface that is in direct contact with a contact surface where said phone and tablet stand will be removably secured, wherein said gel attachment interface is disposed on said bottom surface perimeter disposed on said bottom surfacing of said base and a lever disposed above said base that horizontally extends from said stem that is depressed to activate a suction capability of said gel attachment interface.

10. The phone and tablet stand according to claim 9, wherein said gel attachment is an elastomer.

11. The phone and tablet stand according to claim 10, wherein said elastomer is selected from the group consisting of polyurethane, silicone or PVC.

12. The phone and tablet stand according to claim 9, wherein said stem is manually moved to position said rotatable mounting head in any horizontally upward or downward and vertically upward or downward position.

13. The phone and tablet stand according to claim 9, wherein said lever is lifted to release said gel attachment interface once activated to attach said phone and tablet stand to a desired surface and location.

* * * * *